(12) United States Patent
Shi et al.

(10) Patent No.: US 10,712,959 B2
(45) Date of Patent: Jul. 14, 2020

(54) METHOD, DEVICE AND COMPUTER PROGRAM PRODUCT FOR STORING DATA

(71) Applicant: Dell Products L.P., Round Rock, TX (US)

(72) Inventors: Yongjun Shi, Shanghai (CN); Junping Zhao, Beijing (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/240,876

(22) Filed: Jan. 7, 2019

(65) Prior Publication Data

US 2019/0220208 A1    Jul. 18, 2019

(30) Foreign Application Priority Data

Jan. 18, 2018   (CN) .......................... 2018 1 0050579

(51) Int. Cl.
*G06F 3/06* (2006.01)

(52) U.S. Cl.
CPC ............ *G06F 3/0632* (2013.01); *G06F 3/061* (2013.01); *G06F 3/065* (2013.01); *G06F 3/067* (2013.01);
(Continued)

(58) Field of Classification Search
CPC ...... G06F 3/061; G06F 3/0631; G06F 3/0632; G06F 3/0641; G06F 3/065; G06F 3/0653;
(Continued)

(56) References Cited

U.S. PATENT DOCUMENTS

| 7,043,619 B1 * | 5/2006 | Knight | G06F 3/0605 |
| | | | 709/220 |
| 7,647,329 B1 * | 1/2010 | Fischman | G06F 3/0607 |
| | | | 707/999.1 |

(Continued)

OTHER PUBLICATIONS

Wei-Hsun Cheng, Chun-I Chiang, Chao-Tung Yang, Shuo-Tsung Chen, Jung-Chun Liu, "The Implementation of Supporting Uniform Data Distribution with Software-Dened Storage Service on Heterogeneous Cloud Storage", 2016 IEEE 22nd International Conference on Parallel and Distributed Systems (ICPADS) (Year: 2016).*

(Continued)

*Primary Examiner* — Khoa D Doan
(74) *Attorney, Agent, or Firm* — Ryan, Mason & Lewis, LLP (57) ABSTRACT

Embodiments of the present disclosure relate to a method, device and computer program product for storing data. The method comprises obtaining a first range of replica levels supported by a storage apparatus, wherein the replica level indicates the number of replicas of data. The method further comprises receiving a replica configuration requirement for an application, wherein the application supports a second range of replica levels. Moreover, the method further comprises determining a first replica level for the storage apparatus and a second replica level for the application based on the replica configuration requirement, the first range and the second range. By extracting the replica function supported by the storage apparatus, embodiments of the present disclosure can configure replica levels of the storage apparatus and the application from the global level for the user requirement for replicas of the data service.

20 Claims, 7 Drawing Sheets

(52) U.S. Cl.
CPC .......... G06F 3/0614 (2013.01); G06F 3/0631 (2013.01); G06F 3/0641 (2013.01); G06F 3/0653 (2013.01); *G06F 2206/1004* (2013.01); *G06F 2206/1012* (2013.01)

(58) Field of Classification Search
CPC . G06F 3/067; G06F 2206/1012; G06F 9/5083
See application file for complete search history.

(56) References Cited

U.S. PATENT DOCUMENTS

| | | | | |
|---|---|---|---|---|
| 8,321,867 | B1* | 11/2012 | Holl, II | G06F 3/0605 714/48 |
| 8,713,376 | B1* | 4/2014 | Makin | G06F 11/1451 707/654 |
| 8,849,758 | B1* | 9/2014 | Sivasubramanian | G06F 3/061 707/636 |
| 9,826,030 | B1* | 11/2017 | Dhoolam | H04L 67/1097 |
| 9,826,041 | B1* | 11/2017 | Dhoolam | G06F 3/0631 |
| 9,933,953 | B1* | 4/2018 | Taylor | G06F 3/065 |
| 10,216,432 | B1* | 2/2019 | Kulkarni | G06F 3/067 |
| 10,235,088 | B1* | 3/2019 | Baruch | G06F 3/065 |
| 10,459,655 | B1* | 10/2019 | Greenwood | G06F 3/067 |
| 2005/0240986 | A1* | 10/2005 | Yamamoto | H04L 41/0803 726/1 |
| 2008/0235321 | A1* | 9/2008 | Matsuo | H04L 67/104 709/201 |
| 2009/0248759 | A1* | 10/2009 | Okada | G06F 11/1456 |
| 2013/0085990 | A1* | 4/2013 | Mordvinova | G06F 16/27 707/623 |
| 2015/0186043 | A1* | 7/2015 | Kesselman | G06F 3/0614 711/162 |
| 2017/0153819 | A1* | 6/2017 | Zeng | G06F 11/14 |
| 2018/0260284 | A1* | 9/2018 | Konetski | G06F 11/1448 |

OTHER PUBLICATIONS

I. Arrieta-Salinas, J. E. Armend'riz-Iñigo and J. Navarro, "Classic Replication Techniques on the Cloud," 2012 Seventh International Conference on Availability, Reliability and Security, Prague, 2012, pp. 268-273. (Year: 2012).* hadoop.apache.org, "Apache Hadoop 2.9.2—HDFS Architecture," https://hadoop.apache.org/docs/current/hadoop-project-dist/hadoop-hdfs/HdfsDesign.html, Nov. 13, 2018, 7 pages.

docs.datastax.com, "Configuring Data Consistency," https://docs.datastax.com/en/archived/cassandra/2.0/cassandra/dml/dml_config_consistency_c.html, Jul. 27, 2017, 7 pages.

V. Fereydouny et al., "Ushering in a New Era of Hyper-Converged Big Data Using Hadoop with All-Flash VMware vSAN," VMware and Intel, White Paper, Mar. 16, 2017, 10 pages.

Nutanix, Inc., "Hadoop on Nutanix: Reference Architecture," go.nutanix.com/rs/nutanix/images/TG_Hadoop_on_Nutanix_RA.pdf, 2012, 31 pages.

* cited by examiner

METHOD, DEVICE AND COMPUTER PROGRAM PRODUCT FOR STORING DATA

RELATED APPLICATION(S)

The present application claims priority to Chinese Patent Application No. 201810050579.0, filed Jan. 18, 2018 and entitled "Method, Device and Computer Program Product for Storing Data," which is incorporated by reference herein in its entirety.

FIELD

Embodiments of the present disclosure generally relate to the field of data storage, and more specifically, to a method, device and computer program product for storing data.

BACKGROUND

Distributed storage is a storage technology that stores data on multiple nodes in a distributed manner. The distributed storage system manages and allocates resources of multiple nodes in a unified manner and provides a uniform scheduling interface to the outside device or application. The distributed storage system generally utilizes an extensible architecture which uses a plurality of nodes to share the storage load and can effectively improve reliability and storage efficiency of the storage system through position locating storage information.

Replication is a manner of providing redundancy to data and services in a distributed storage system. Data replication refers to storing the same copy of data on different nodes so that when data stored on one node is lost, it is still possible to obtain this data from other nodes. The number of replicas may be set based on a user's demands. Generally, too few replicas would reduce reliability of data storage, while too many replicas would increase the delay of the storage system.

SUMMARY

Embodiments of the present disclosure provide a method, device and computer program product for storing data.

In an aspect of the present disclosure, there is provided a method for writing data. The method comprises: obtaining a first range of replica levels supported by a storage apparatus, wherein the replica level indicates the number of replicas of data; receiving a replica configuration requirement for an application, wherein the application supports a second range of replica levels; and determining a first replica level for the storage apparatus and a second replica level for the application based on the replica configuration requirement, the first range and the second range.

In another aspect of the present disclosure, there is provided a device for storing data. The device comprises a processing unit and a memory, where the memory is coupled to the processing unit and stores instructions. The instructions, when executed by the processing unit, perform the actions of: obtaining a first range of replica levels supported by a storage apparatus, wherein the replica level indicates the number of replicas of data; receiving a replica configuration requirement for an application, wherein the application supports a second range of replica levels; and determining a first replica level for the storage apparatus and a second replica level for the application based on the replica configuration requirement, the first range and the second range.

In still another aspect of the present disclosure, there is provided a computer program product. The computer program product is tangibly stored on a non-transient computer readable medium and comprises computer executable instructions. The computer executable instructions, when executed, cause a computer to perform the method or process according to embodiments of the present disclosure.

This Summary is provided to introduce a selection of concepts in a simplified form that are further described below in the Detailed Description. This Summary is not intended to identify key features or essential features of the present disclosure, nor is it intended to be used to limit the scope of the embodiments of the present disclosure.

BRIEF DESCRIPTION OF THE DRAWINGS

Through the following detailed description of the example embodiments of the present disclosure with reference to the accompanying drawings, the above and other objectives, features, and advantages of the present disclosure will become more apparent. In example embodiments of the present disclosure, the same reference number usually represents the same element.

DETAILED DESCRIPTION

Preferred embodiments of the present disclosure will be described in the following in greater detail with reference to the drawings. Although some specific embodiments of the present disclosure are displayed in the drawings, it is to be understood that the present disclosure may be implemented in various manners, not limited to the embodiments illustrated herein. On the contrary, these embodiments are provided to make the present disclosure more thorough and complete and convey the scope of the present disclosure completely to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "an example embodiment" and "an embodiment" are to be read as "at least one example embodiment." The term "another embodiment" is to be read as "at least another embodiment." The terms "first," "second" and others can denote different or identical objects unless the context clearly indicates otherwise. The term "storage apparatus" denotes a non-volatile memory for storing data permanently, such as a disk.

Examples of a disk include, but are not limited to, a hard disk drive (HDD), an optical disk drive, a solid state drive (SSD) and so on.

Traditionally, the storage apparatus may have a data replica function, while some applications may also have a data replica function. Generally, the application and the storage apparatus do not know the replica function of each other and thus, they perform respective data replication or duplication independently. For example, the application may be configured with M replicas while the storage apparatus may be configured with N replicas, and then the storage system will generate M*N replicas in total, resulting in too many data replicas.

Figure 1:
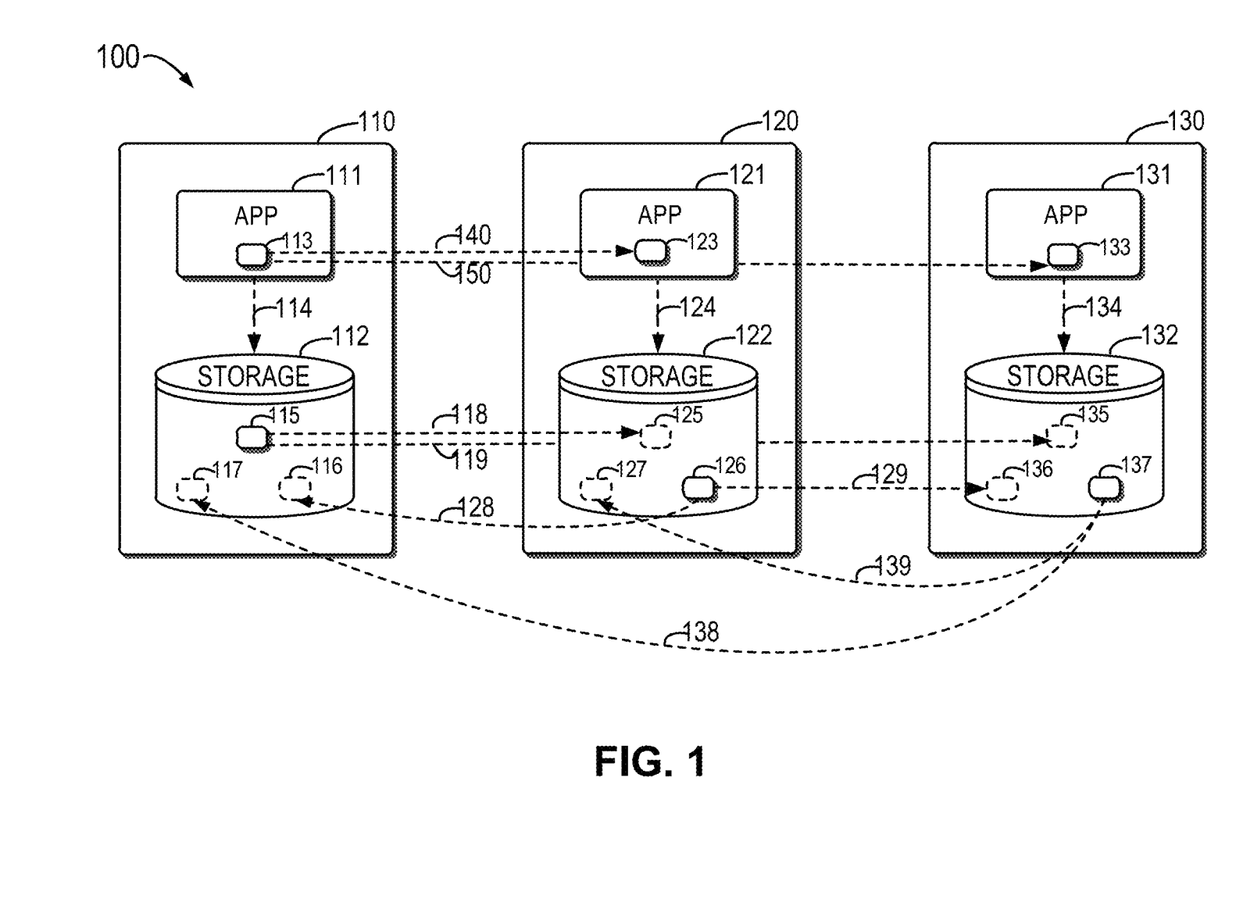
FIG. 1 is a schematic diagram of storing data in a traditional storage system.

For example, FIG. 1 is a schematic diagram of storing data in a traditional storage system 100. As illustrated in FIG. 1, the storage system 100 includes three nodes 110, 120 and 130, each node includes its respective application (APP) and storage apparatus (STORAGE), and applications and storage apparatus are both configured to use three replicas, respectively. For example, the node 110 includes an application 111 and a storage apparatus 112, the node 120 includes an application 121 and a storage apparatus 122, and the node 130 includes an application 131 and a storage apparatus 132.

At a certain moment, when data 113 is generated in the application 111, since the application layer is configured with three replicas, it is necessary to synchronize the data at the application layer. As shown by arrow 140, the data 113 is synchronized to the application 121 to generate data 123; and as shown by arrow 150, data 113 is synchronized to the application 131 to generate data 133. Next, data in the application is written into a storage apparatus. As shown by arrow 114, data 113 in the application 111 is stored in the storage apparatus 112 to generate data 115. As shown by arrow 124, data 123 in the application 121 is stored in the storage apparatus 122 to generate data 126. As indicated by arrow 134, data 133 in the application 131 is stored in the storage apparatus 132 to generate data 137.

In the traditional storage system 100, since the application layer and the storage layer implement a data replica independently, the storage layer will continue to implement data replicas based on the three replicas that are configured. For instance, as shown by arrow 118, data 115 in the storage apparatus 112 is synchronized to the storage apparatus 122 to generate data 125, and as shown by arrow 119, data 115 in the storage apparatus 112 is synchronized to the storage apparatus 132 to generate data 135. Also, as indicated by arrow 128, data 126 in the storage apparatus 122 is synchronized to the storage apparatus 112 to generate data 116, and as shown by arrow 129, data 126 in the storage apparatus 122 is synchronized to the storage apparatus 132 to generate data 136. Moreover, as shown by arrow 138, data 137 in the storage apparatus 132 is synchronized to the storage apparatus 112 to generate data 117, and as indicated by arrow 139, data 137 in the storage apparatus 132 is synchronized to the storage apparatus 122 to generate data 127.

As can be seen from the schematic diagram of FIG. 1, since the application at the application layer and the storage apparatus at the storage layer implement their respective data replicas, for the same data 113, there are 9 data replicas in total generated in three storage apparatuses, namely, data 115, 116, 117, 125, 126, 127, 135, 136 and 137. However, as the user's demand for data replicas may be only 3 replicas, the traditional replica configuration method would result in many data replicas, which degrades the performance of the storage system and consumes too many storage resources. In addition, as the storage apparatus does not obtain the replica of the application, the deduplication operation in the storage apparatus may collide with the replica function of the application. Furthermore, as different types of storage apparatuses may have different preferences, the traditional replica configuration method cannot meet the requirement for different preferences.

Embodiments of the present disclosure provide an approach for storing data. In accordance with embodiments of the present disclosure, by obtaining the replica function supported by the storage apparatus, it is possible to configure the replica level of the storage apparatus and the application from the global level for a user's replica demands for the data service. As the replica configuration at the global level can avoid unnecessary data replicas, embodiments of the present disclosure can achieve better storage performance and resource utilization efficiency.

Furthermore, embodiments of the present disclosure can also coordinate other functions, such as a deduplication function, between the application and the storage apparatus from the global level, and can take individual preferences of different types of storage apparatuses into account to configure proper replica configuration level. In addition, embodiments of the present disclosure may select the replica levels of the application and the storage apparatus based on the pre-collected test result, thereby ensuring the operating efficiency of the selected configuration.

Basic principles and several example implementations of the present disclosure will be described below with reference to FIGS. 2-7. It is to be understood that these example embodiments are only provided to enable those skilled in the art to better understand and further implement embodiments of the present disclosure, rather than to limit the scope of the present disclosure in any manner.

Figure 2:
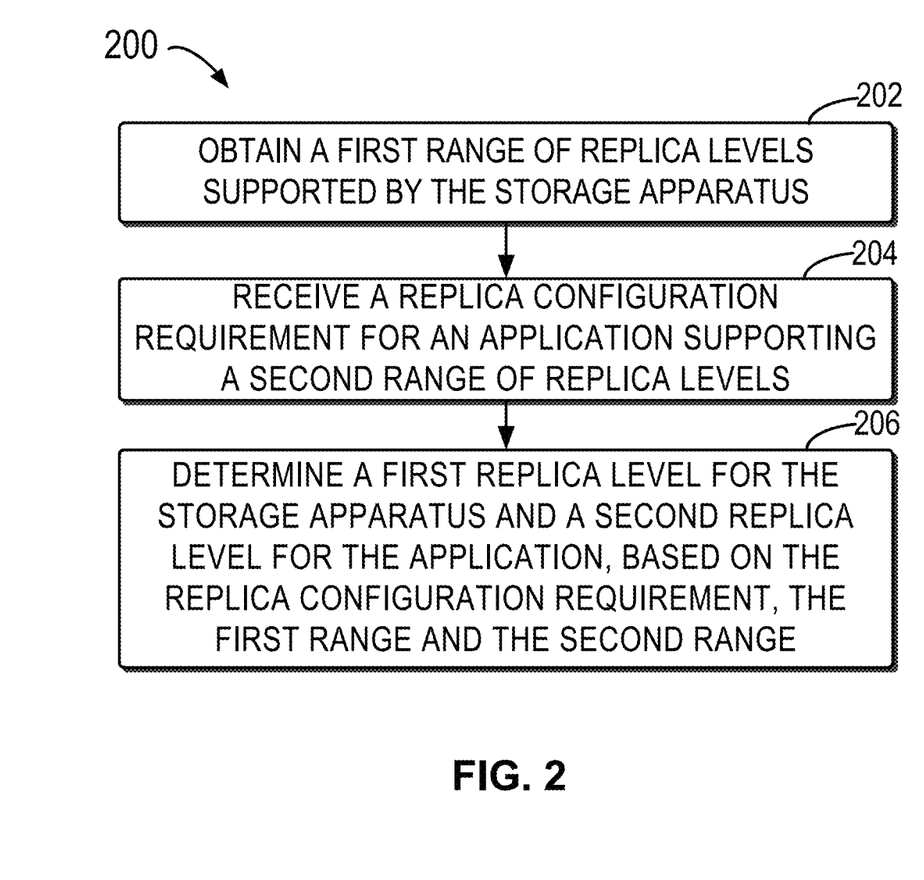
FIG. 2 is a flow chart illustrating a method for storing data in accordance with embodiments of the present disclosure.

FIG. 2 is a flow chart illustrating a method 200 for storing data in accordance with embodiments of the present disclosure. It is to be understood that method 200 may be implemented by a processor in the storage system. At 202, a first range of the replica level supported by the storage apparatus is obtained, and the replica level indicates the number of replicas of the data. For example, it is possible to use a storage apparatus management interface (such as RESTful interface) to query the availability of corresponding functions of the storage apparatus (such as disk). In some embodiments, in addition to obtaining the replica level of the storage apparatus, it is further possible to obtain other functions of the storage apparatus, such as a deduplication function, a defragmentation function and an automatic balancing function, and so on. Table 1 below shows extracting functions supported by the storage apparatus.

TABLE 1

Aggregation of Functions Supported by the Storage Apparatus

| Name of the storage apparatus | Address | Function name | Function version | Function property |
|---|---|---|---|---|
| First storage apparatus | 1.1.1.1 | Replica | 6.2 | 1-3 |
| First storage apparatus | 1.1.1.1 | Deduplication | 6.2 | on/off |
| Second storage apparatus | 1.1.1.2 | Replica | 2.0 | 1-2 |

As shown in Table 1, the range of the replica levels supported by the first storage apparatus is 1-3, namely, 1 replica, 2 replicas or 3 replicas. In some embodiments described herein, 1 replica means that the same data is only stored in one node, that is, there are no copies of data. However, it is to be understood that "0" copy may also be used to indicate that data are only stored in one node. The scope of embodiments of the present disclosure is not limited by how the replica level is represented by a number. In addition, it is to be understood that in an asynchronous storage system, the same function of different types of storage apparatuses may be indicated by different names. Therefore, it is possible to pre-process the function names. In some embodiments, the storage apparatus may also register its function information into, for instance, Table 1, through a plugin. Optionally, the content in Table 1 may be reviewed, edited and updated by an administrator of the storage system.

In some embodiments, the storage apparatus may be software-defined storage (SDS), which is widely applied in a software-defined data center or cloud, and it integrates different storage resources to implement policy-driven deployment and management, and finally achieves the purpose of storage as service. In other words, the server, storage apparatus, network, security and other sources in the data center may be defined by software and allocated automatically. Since different types of storage apparatuses (such as various hard disks in an asynchronous storage system from different manufacturers) may exist in SDS, obtaining functions supported respectively by different types of storage apparatuses is beneficial for taking preferences of different types of storage apparatuses into account so as to configure appropriate replica configuration levels.

At 204, the replica configuration requirement for the application is received, and the application supports a second range of the replica level. For example, when the user uses the application, generally there exist specific requirements for replica configuration, for instance, at least three replicas, which indicates that the same data should be stored in a persistent storage apparatus with at least three nodes.

In some embodiments, the application may be based on a third platform, which means an application running on a third platform backed by cloud services, mobile broadband networks, big data analysis, socialization technologies and so on. The application has its own range of replica levels, for instance, the application may be Hadoop, while the Hadoop distributed file system (HDFS) supports three copies of each data block by default.

At 206, the first replica level for the storage apparatus and the second replica level for the application are determined based on the replica configuration requirement, the first range and the second range. For example, a first replica level for a storage apparatus is selected from the first range, and a second replica level for an application is selected from the second range, based on the replica configuration requirement of the user. For example, when the replica configuration requirement is 3 replicas while the first range and the second range are both 1-3, the selectable candidate configuration set includes: the first replica level is 3, and the second replica level is 1; the first replica level is 2, and the second replica level is 2; and the first replica level is 1 and the second replica level is 3.

In some embodiments, it is possible to configure the second replica level as the lowest level based on the preference of replica configuration of the storage apparatus. For example, if a certain type of storage apparatus tends to use its own data replica while disabling the data replica of the application, then it is possible to configure so as not to use the data replica at the application layer; instead, if the storage apparatus prefers to use the data replica at the application layer, then it is possible to use the data replica at the application layer for the sake of high-performance. In some embodiments, the first replica level and the second replica level may be determined based on the pre-collected test result. For example, after a candidate configuration set is generated, it is possible to select the configuration with optimal performance in the candidate configuration set based on historical test results, thereby ensuring the operating efficiency of the selected configuration.

Generally speaking, the larger the number of replicas, the longer the write waiting time needed and the greater the data delay. Meanwhile, more replicas will consume more storage resources, network traffic and cache. Therefore, the replica levels of the storage apparatus and the application are configured from the global level according to embodiments of the present disclosure, thereby reducing unnecessary data replicas and achieving better storage performance and resource utilization efficiency.

Figure 3:
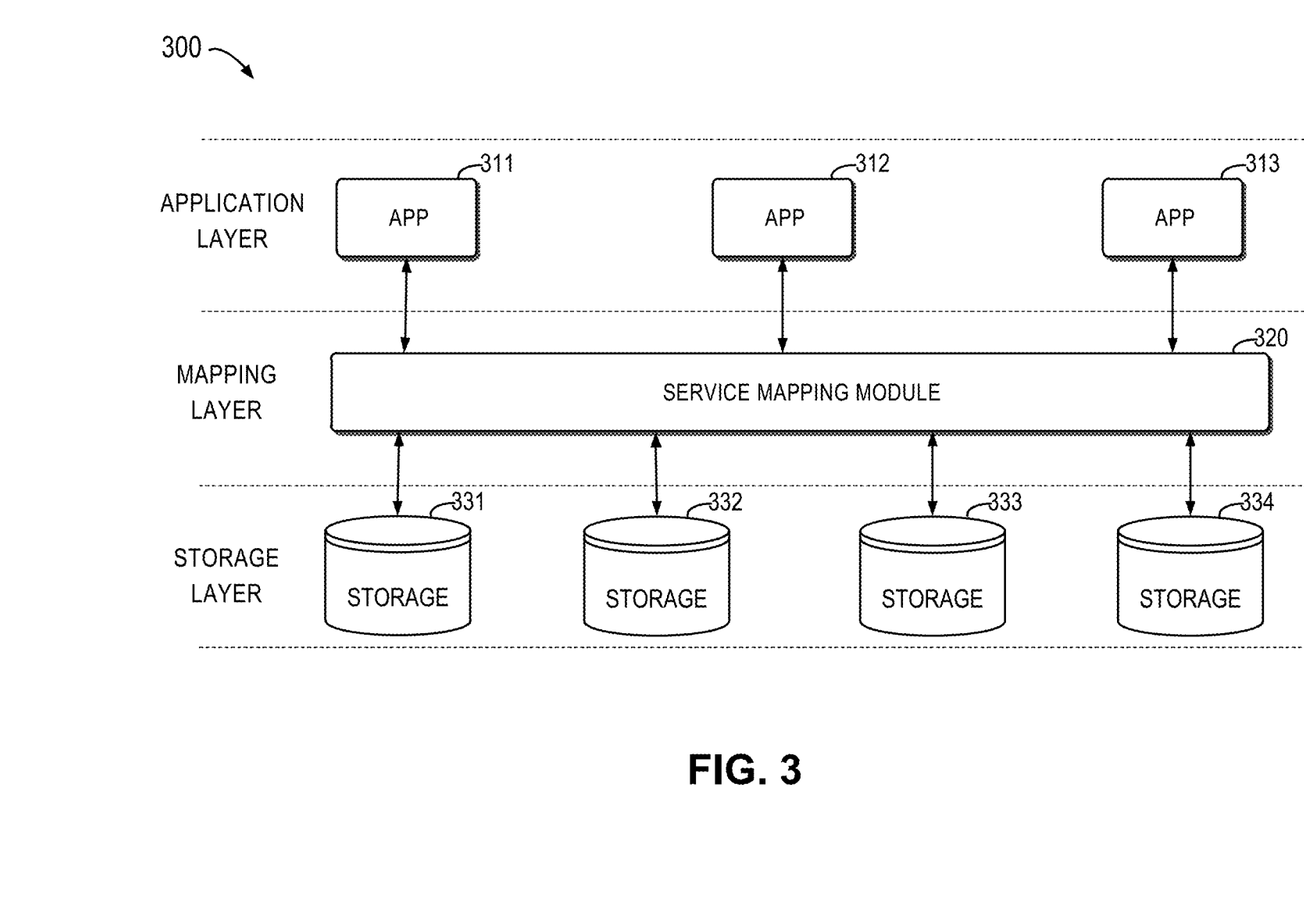
FIG. 3 is a schematic diagram illustrating an example architecture of a storage system in accordance with embodiments of the present disclosure.

FIG. 3 is a schematic diagram illustrating an example architecture 300 of a storage system in accordance with embodiments of the present disclosure. As illustrated in FIG. 3, the architecture 300 includes, from top down, an application layer, a mapping layer and a storage layer, where the application layer includes applications (APP) 311, 312 and 313, the mapping layer includes a service mapping module 320 proposed according to embodiments of the present disclosure, while the storage layer includes storage apparatuses 331, 332, 333 and 334.

In some embodiments, under the offline configuration state before the storage system is brought online, the service mapping module 320 may extract functions supported by each storage apparatus from the storage layer and store them in aggregation into Table 1. Optionally, the service mapping module 320 may provide functions of data service extraction, data service configuration and data service change monitoring and so on. In embodiments of the present disclosure, the service mapping module 320 is very flexible and extendable, and it is possible to add or register some additional services into the service mapping module 320.

In some embodiments, the service mapping module 320 maps the service provided by the storage layer to the application layer and makes the corresponding recommendation according to replica configuration demand from the user. Therefore, the service mapping module 320 enables the application to know the replica level range supported by the storage apparatus, and determine the replica level of the storage apparatus and the replica level of the application from the global level.

In some embodiments, the storage apparatus 331 and the storage apparatus 332 may be different types of storage apparatuses (for example, products from different manufacturers) having different replica levels and preferences. Optionally, it is possible to determine, based on the replica configuration demand for application 311, the replica level for the storage apparatus 331 and the replica level for the application 311 as a first configuration. Meanwhile, it is also possible to determine the replica level for the storage apparatus 332 and the replica level for the application 311 as a second configuration. In the following, the first configuration and the second configuration may be compared (for example, based on the result of experiment), and the first configuration or the second configuration may be selected as the storage configuration for application 311.

Figure 4:
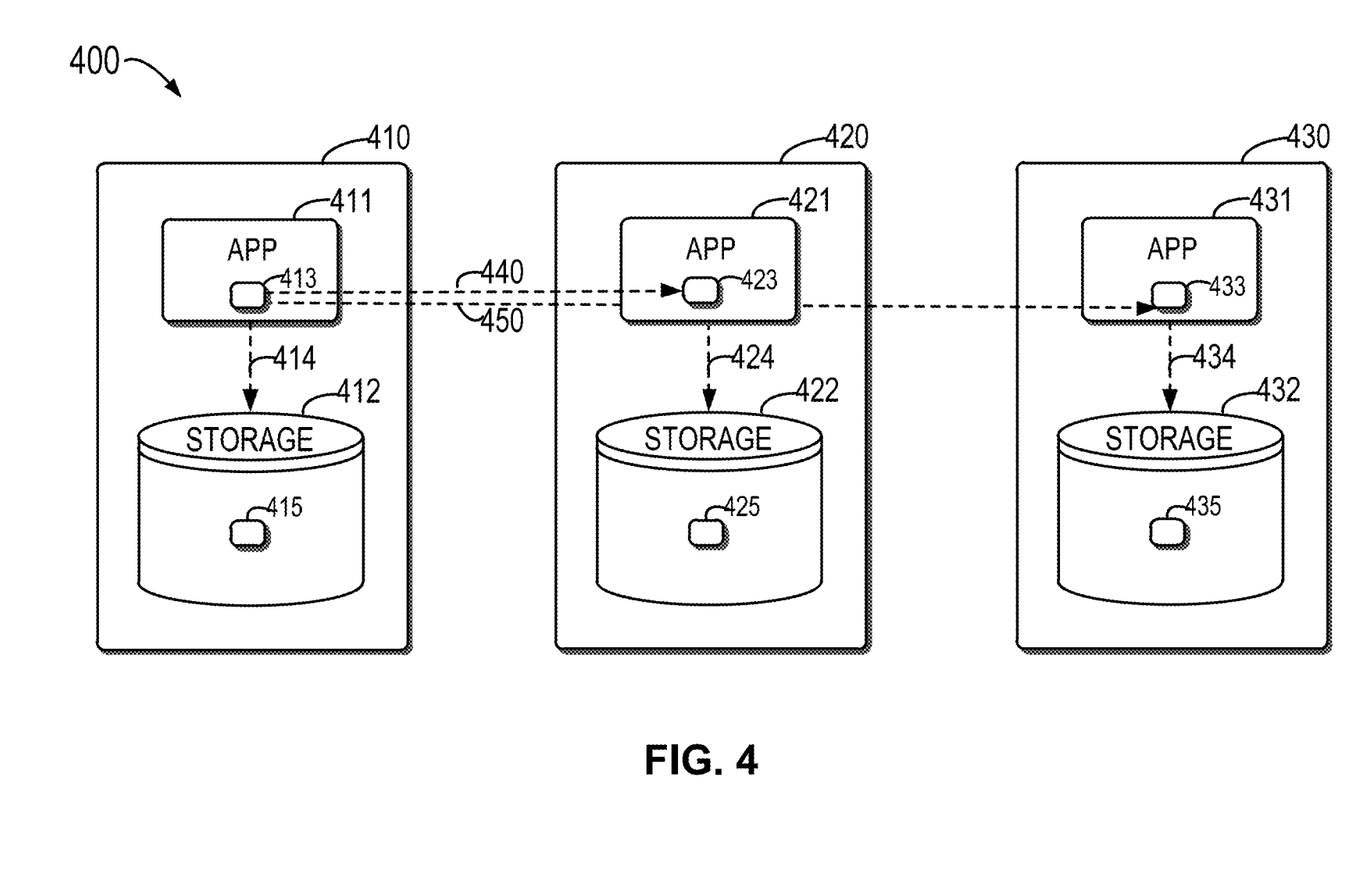
FIG. 4 is a schematic diagram of storing data in an example storage system in accordance with embodiments of the present disclosure.

FIG. 4 is a schematic diagram of storing data in an example storage system 400 in accordance with embodiments of the present disclosure. In the example shown in FIG. 4, for example, for the configuration demand for three data replicas, a storage system 400 chooses to configure three replicas at the application layer and only configure one replica at the storage layer. That is, the storage layer does not use the data replica function.

As illustrated in FIG. 4, the storage system 400 includes nodes 410, 420 and 430, and each node includes an application (APP) and a storage apparatus therein, where the application is operating on the storage apparatus. For example, the node 410 includes an application 411 and a storage apparatus 412, the node 420 includes an application 421 and a storage apparatus 422, and the node 430 includes an application 431 and a storage apparatus 432.

At a certain moment, data 413 is generated in application 411. As the application layer is configured with three replicas, it is necessary to synchronize the data at the application layer. As indicated by arrow 440, data 413 is synchronized to application 421 to generate data 423, and as shown by arrow 450, data 413 is synchronized to application 431 to generate data 433. Next, data in the application is stored in the storage apparatus. As indicated by arrow 414, data 413 in the application 411 is stored in the storage apparatus 412 to generate data 415. As shown by arrow 424, data 423 in the application 421 is stored in the storage apparatus 422 to generate data 425. As shown by arrow 434, data 433 in the application 431 is stored in the storage apparatus 432 to generate data 435.

Continuing to refer to FIG. 4, since the storage layer is only configured with one replica, data 415, 425 and 435 in the storage apparatus will not be replicated to other storage apparatuses. In this manner, for one copy of data 413, there are three data replicas in total generated in the three storage apparatuses, namely, data 415, 425 and 435, which meets the user's requirement for the replica configuration of the storage system, as well as minimizes the number of replicas, thereby improving the performance of the storage system.

Figure 5:
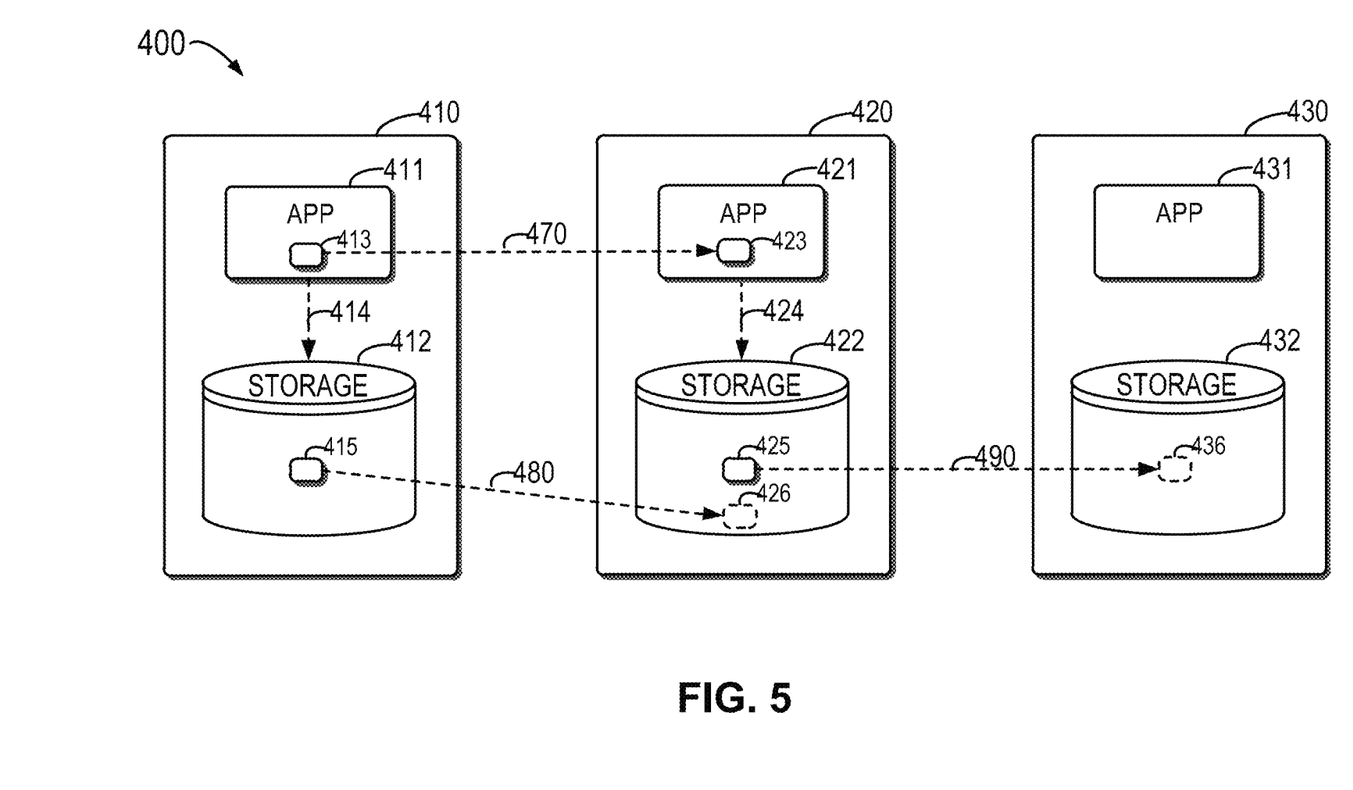
FIG. 5 is another schematic diagram of storing data in an example storage system in accordance with embodiments of the present disclosure.

FIG. 5 is another schematic diagram of storing data in an example storage system 400 in accordance with embodiments of the present disclosure. As shown in FIG. 5, for the configuration demand of three data replicas, the storage system 400 chooses to configure two replicas at the application layer and only configure two replicas at the storage layer. That is, the application layer and the storage layer are each configured with two data replicas. In some embodiments, the unit size (namely, granularity) of data blocks of the data replicas at the application layer may be different from that of data blocks of the data replicas at the storage layer. In some embodiments, the synchronization granularity of the application layer may be, for instance, 64 KB, while the synchronization granularity of the storage layer may be, for instance, 1 MB.

As shown in FIG. 5, at a certain moment, data 413 is generated in application 411. Since the application layer is configured with two replicas, it is necessary to synchronize the data at the application layer. As indicated by arrow 470, data 413 is synchronized to the application 421 to generate data 423, and two replicas at the application layer have been completed. Next, data in the application is stored in the storage apparatus. As shown by arrow 414, data 413 in the application 411 is stored in the storage apparatus 412 to generate data 415, and as shown by arrow 424, data 423 in the application 421 is stored in the storage apparatus 422 to generate data 425.

Continuing to refer to FIG. 5, since the storage layer is also configured with two replicas, data 415 and 425 in the storage apparatuses is to be replicated respectively to other storage apparatuses once. As shown by arrow 480, data 415 in the storage apparatus 412 is synchronized to the storage apparatus 422 to generate data 426, and as shown by arrow 490, data 425 in the storage apparatus 422 is synchronized to the storage apparatus 432 to generate data 436. In this manner, for the data 413, there are four data replicas in total generated in three storage apparatuses, namely, data 415, 425, 426 and 436, which meets the user's requirement of replica configuration, as well as generates fewer data replicas compared with the traditional storage method, thereby improving performance of the storage system.

Figure 6:
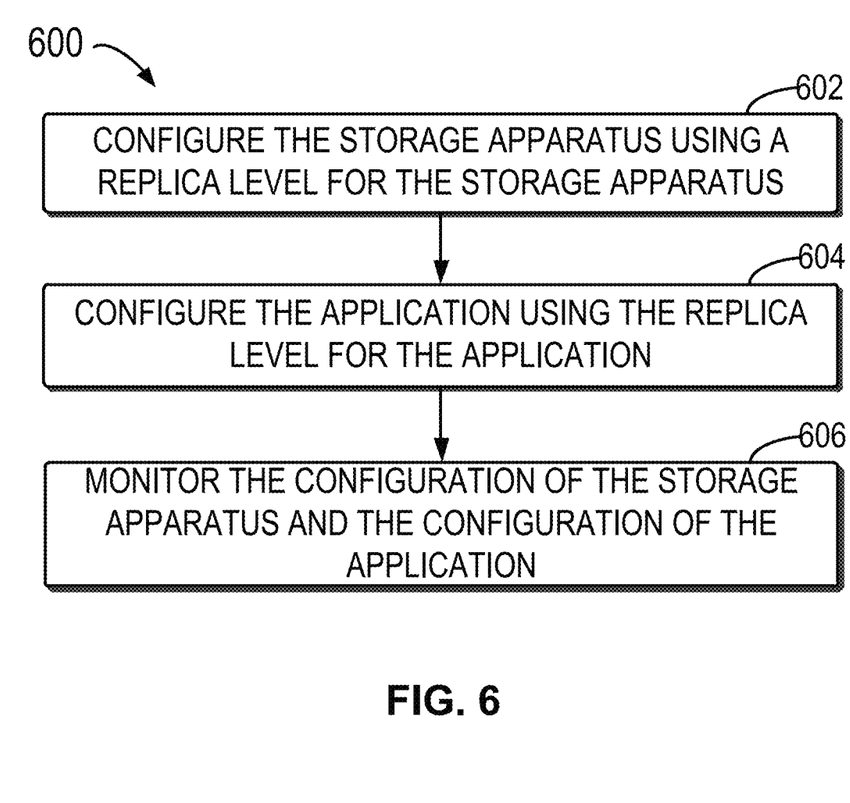
FIG. 6 is a flow chart illustrating a method for configuring a storage system in accordance with embodiments of the present disclosure.

FIG. 6 is a flow chart illustrating a method 600 for configuring a storage system in accordance with embodiments of the present disclosure. At 602, the replica level of the storage apparatus is used to configure the storage apparatus. For example, it is possible to use a management interface to create a storage pool, and then configure the corresponding data replica level according to the configuration. In some embodiments, it is also possible to configure the deduplication operation, defragmentation operation and/or automatic balancing operation of the storage apparatus. In some embodiments, if both the storage apparatus and the application enable data replicas, the deduplication operation of the storage apparatus may be disabled to avoid unnecessary data deletion. In some embodiments, if the storage apparatus or application does not enable data replicas, then the deduplication operation of the storage apparatus may be enabled.

At 604, the replica level of the application is used to configure the application. After the storage apparatus has been configured, it is possible to configure the application in the determined replica level. At 606, the configuration of the storage apparatus and the configuration of the application are monitored. For example, the configuration processes of the storage apparatus and the application are monitored, key steps are logged, and exception logs are collected upon occurrence of abnormalities. By use of the method 600 in accordance with embodiments of the present disclosure, automation of a corresponding configuration may be realized, and operation may be created using an interface such that management in the storage system is simpler and more effective. Therefore, embodiments of the present disclosure enable configuration of the replica level of the storage system from the global level, thereby avoiding too many data replicas.

Figure 7:
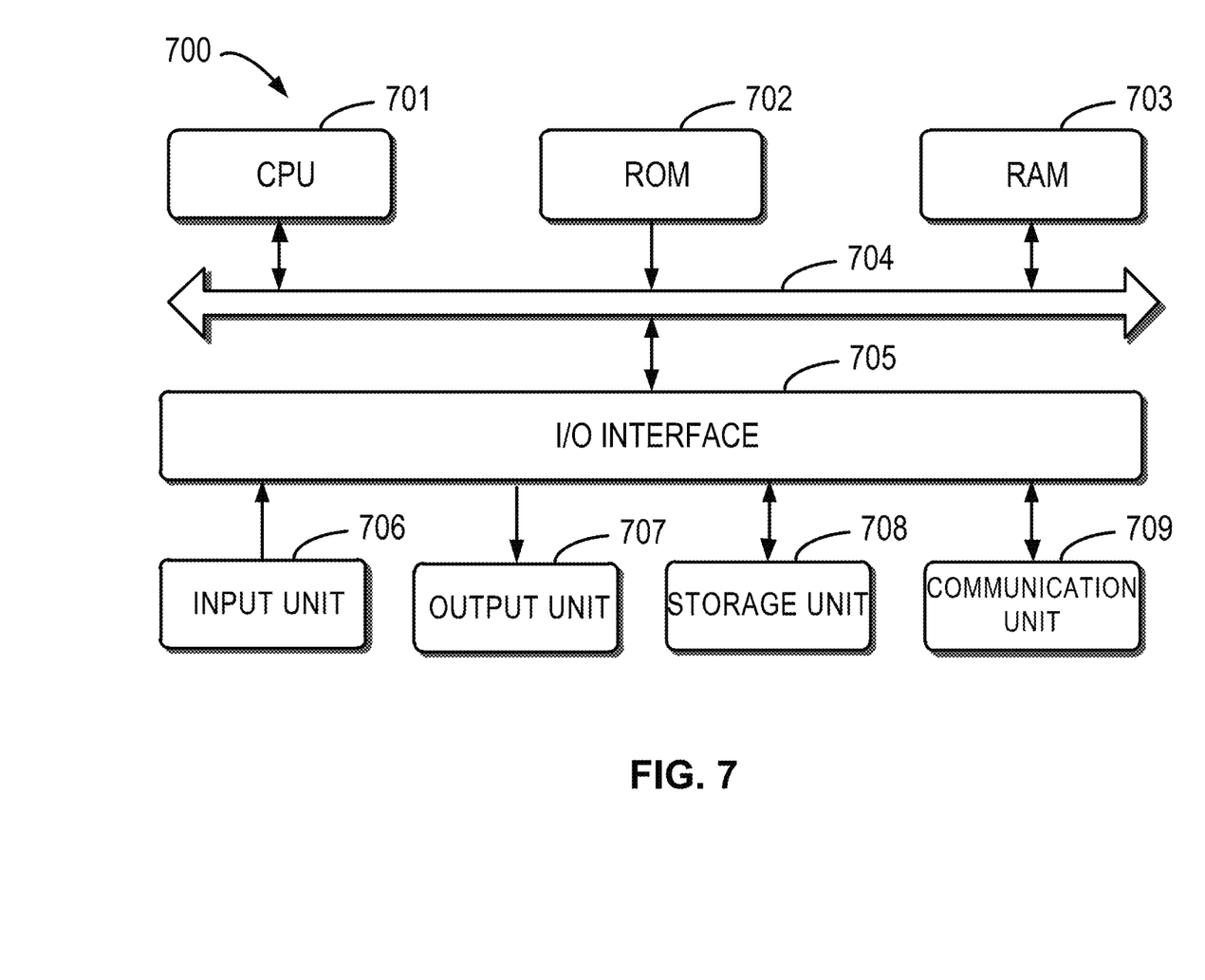
FIG. 7 is a schematic block diagram illustrating a device that may be used to implement embodiments of the present disclosure.

FIG. 7 is a schematic diagram illustrating a device 700 that may be used to implement embodiments of the present disclosure. As illustrated, the device 700 includes a central processing unit (CPU) 701, which may execute various appropriate actions and processing based on the computer program instructions stored in a read-only memory (ROM) 702 or the computer program instructions loaded into a random access memory (RAM) 703 from a storage unit 708. The RAM 703 also stores all kinds of programs and data required by operating the storage device 700. CPU 701, ROM 702 and RAM 703 are connected to each other via a bus 704 to which an input/output (I/O) interface 705 is also connected.

A plurality of components in the device 700 are connected to the I/O interface 705, including: an input unit 706, such as keyboard, mouse and the like; an output unit 707, such as various types of displays, loudspeakers and the like; a storage unit 708, such as the magnetic disk, optical disk and the like; and a communication unit 709, such as network card, modem, wireless communication transceiver and the like. The communication unit 709 allows the device 700 to exchange information/data with other devices through computer networks such as Internet and/or various telecommunication networks.

Each procedure and process described above may be executed by a processing unit 701. For example, in some embodiments, the method may be implemented as computer software programs, which are tangibly included in a machine-readable medium, such as storage unit 708. In some embodiments, the computer program may be partially or completely loaded and/or installed to the device 700 via ROM 702 and/or the communication unit 709. When the computer program is loaded to RAM 703 and executed by CPU 701, one or more steps of the above described methods 200 and 600 are implemented.

In some embodiments, the methods 200 and 600 described above may be implemented as a computer program product. The computer program product may include a computer-readable storage medium loaded with computer-readable program instructions thereon for executing various aspects of the present disclosure.

The computer-readable storage medium may be a tangible device capable of holding and storing instructions used by the instruction-executing device. The computer-readable storage medium can be, but is not limited to, for example, electrical storage devices, magnetic storage devices, optical storage devices, electromagnetic storage devices, semiconductor storage devices or any random appropriate combinations thereof. More specific examples (non-exhaustive list) of the computer-readable storage medium include: portable computer disk, hard disk, RAM, ROM, erasable programmable read-only memory (EPROM or flash), static random access memory (SRAM), portable compact disk read-only memory (CD-ROM), digital versatile disk (DVD), memory stick, floppy disk, mechanical coding device, such as a punched card storing instructions or an emboss within a groove, and any random suitable combinations thereof. The computer-readable storage medium used herein is not interpreted as a transient signal itself, such as a radio wave or other freely propagated electromagnetic wave, an electromagnetic wave propagated through a waveguide or other transmission medium (such as optical pulses passing through fiber-optic cables), or electric signals transmitted through electric wires.

The computer-readable program instructions described herein may be downloaded from the computer-readable storage medium to various computing/processing devices, or to external computers or external storage devices via Internet, local area network (LAN), wide area network (WAN) and/or wireless network. The network may include copper transmission cables, optical fiber transmission, wireless transmission, routers, firewalls, switches, gateway computers and/or edge servers. The network adapter or network interface in each computing/processing device receives computer-readable program instructions from the network, and forwards the computer-readable program instructions for storage in the computer-readable storage medium of each computing/processing device.

The computer program instructions for executing the operations of the present disclosure may be assembly instructions, instructions of instruction set architecture (ISA), machine instructions, machine-related instructions, microcodes, firmware instructions, state setting data, or a source code or target code written by any combinations of one or more programming languages including object-oriented programming languages and conventional procedural programming languages. The computer-readable program instructions may be completely or partially executed on the user computer, or executed as an independent software package, or executed partially on the user computer and partially on the remote computer, or completely executed on the remote computer or the server. In the case where a remote computer is involved, the remote computer may be connected to the user computer by any type of networks, including LAN or WAN, or connected to an external computer (such as via Internet provided by the Internet service provider). In some embodiments, the electronic circuit is customized by using the state information of the computer-readable program instructions. The electronic circuit may be a programmable logic circuit, a field programmable gate array (FPGA) or a programmable logic array (PLA) for example. The electronic circuit may execute computer-readable program instructions to implement various aspects of the present disclosure.

The computer-readable program instructions may be provided to the processing unit of a general purpose computer, a dedicated computer or other programmable data processing devices to generate a machine, causing the instructions, when executed by the processing unit of the computer or other programmable data processing devices, to generate a device for implementing the functions/actions specified in one or more blocks of a flow chart and/or block diagram. The computer-readable program instructions may also be stored in the computer-readable storage medium. These instructions enable the computer, the programmable data processing device and/or other devices to operate in a particular way, such that the computer-readable medium storing instructions may comprise a manufactured article that includes instructions for implementing various aspects of the functions/actions specified in one or more blocks of the flow chart and/or block diagram.

The computer-readable program instructions may also be loaded into computers, other programmable data processing devices or other devices, so as to execute a series of operational steps on the computers, other programmable data processing devices or other devices to generate a computer implemented process. Therefore, the instructions executed on the computers, other programmable data processing devices or other devices can realize the functions/actions specified in one or more blocks of the flow chart and/or block diagram.

The accompanying flow charts and block diagrams present possible architectures, functions and operations realized by the system, method and computer program product according to a plurality of embodiments of the present disclosure. At this point, each block in a flow chart and/or block diagram may represent a module, a program segment, or a portion of the instruction. The module, the program segment or the portion of the instruction includes one or more executable instructions for implementing specified logic functions. In some alternative implementations, the function indicated in the block may also occur in an order different from the one represented in the drawings. For example, two consecutive blocks actually may be executed in parallel, and sometimes they may also be executed in a reverse order depending on the involved functions. It should also be noted that each block in the flow chart and/or block diagram, and any combinations of the blocks thereof may be implemented by a dedicated hardware-based system for implementing specified functions or actions, or a combination of the dedicated hardware and the computer instructions.

Various embodiments of the present disclosure have been described above, and the above explanation is illustrative rather than exhaustive and is not limited to the disclosed embodiments. Without departing from the scope and spirit of each explained embodiment, many alterations and modifications are obvious for those ordinary skilled in the art. The selection of terms in the text aims to best explain principle, actual application or technical improvement in the market of each embodiment or make each embodiment disclosed in the text comprehensible for those of ordinary skill in the art.

What is claimed is:

1. A method for storing data, comprising:
   obtaining a first range of replica levels supported by a storage apparatus, the replica level indicating the number of replicas of data;
   receiving a replica configuration requirement for an application, the application supporting a second range of replica levels; and
   determining a first replica level for the storage apparatus and a second replica level for the application based on the replica configuration requirement, the first range and the second range.

2. The method according to claim 1, further comprising:
   configuring the storage apparatus using the first replica level;
   configuring the application using the second replica level; and
   monitoring configuration of the storage apparatus and configuration of the application.

3. The method according to claim 2, wherein configuring the storage apparatus comprises:
   configuring one or more of a deduplication operation, a defragmentation operation and an automatic balancing operation for the storage apparatus.

4. The method according to claim 2, wherein configuring the storage apparatus comprises:
   in response to the first replica level indicating that the storage apparatus enables a data replica and the second replica level indicating that the application enables a data replica, disabling a deduplication operation of the storage apparatus; and
   in response to the first replica level indicating that the storage apparatus disables a data replica or the second replica level indicating that the application disables a data replica, enabling the deduplication operation of the storage apparatus.

5. The method according to claim 1, wherein the storage apparatus is a first storage apparatus, and the method further comprises:
   obtaining a third range of replica levels supported by a second storage apparatus having a different type from the first storage apparatus.

6. The method according to claim 5, wherein the first replica level of the first storage apparatus and the second replica level of the application are included in a first configuration, and the method further comprises:
   determining a second configuration including a third replica level for the second storage apparatus and a fourth replica level for the application based on the replica configuration requirement, the second range and the third range; and
   in response to determining that the second configuration is superior to the first configuration:
      configuring the second storage apparatus using the third replica level; and
      configuring the application using the fourth replica level.

7. The method according to claim 1, wherein determining the first replica level for the storage apparatus and the second replica level for the application comprises:
   in response to the storage apparatus being configured to disable a data replica of the application, configuring the second replica level as a lowest level.

8. The method according to claim 1, wherein determining the first replica level for the storage apparatus and the second replica level for the application comprises:
   determining the first replica level and the second replica level based on a pre-collected test result.

9. The method according to claim 1, wherein the storage apparatus is a software-defined storage (SDS), and the application is a third platform-based application.

10. A device for storing data, comprising:
    a processing unit; and
    a memory coupled to the processing unit and storing instructions, the instructions, when executed by the processing unit, perform the actions of:
       obtaining a first range of replica levels supported by a storage apparatus, the replica level indicating the number of replicas of data;
       receiving a replica configuration requirement for an application, the application supporting a second range of replica levels; and
       determining a first replica level for the storage apparatus and a second replica level for the application based on the replica configuration requirement, the first range and the second range.

11. The device according to claim 10, the actions further comprising:
    configuring the storage apparatus using the first replica level;
    configuring the application using the second replica level; and
    monitoring configuration of the storage apparatus and configuration of the application.

12. The device according to claim 11, wherein configuring the storage apparatus comprises:
    configuring one or more of a deduplication operation, a defragmentation operation and an automatic balancing operation for the storage apparatus.

13. The device according to claim 11, wherein configuring the storage apparatus comprises:
    in response to the first replica level indicating that the storage apparatus enables a data replica and the second replica level indicating that the application enables a data replica, disabling a deduplication operation of the storage apparatus; and
    in response to the first replica level indicating that the storage apparatus disables a data replica or the second replica level indicating that the application disables a data replica, enabling the deduplication operation of the storage apparatus.

14. The device according to claim 10, wherein the storage apparatus is a first storage apparatus, and the actions further comprise:
    obtaining a third range of replica levels supported by a second storage apparatus having a different type from the first storage apparatus.

15. The device according to claim 14, wherein the first replica level of the first storage apparatus and the second replica level of the application are included in a first configuration, and the actions further comprise:
    determining a second configuration including a third replica level for the second storage apparatus and a fourth replica level for the application based on the replica configuration requirement, the second range and the third range; and
    in response to determining that the second configuration is superior to the first configuration:
       configuring the second storage apparatus using the third replica level; and configuring the application using the fourth replica level.

16. The device according to claim 10, wherein determining the first replica level for the storage apparatus and the second replica level for the application comprises:
   in response to the storage apparatus being configured to disable a data replica of the application, configuring the second replica level as a lowest level.

17. The device according to claim 10, wherein determining the first replica level for the storage apparatus and the second replica level for the application comprises:
   determining the first replica level and the second replica level based on a pre-collected test result.

18. The device according to claim 10, wherein the storage apparatus is a software-defined storage (SDS), and the application is a third platform-based application.

19. A computer program product being tangibly stored on a non-transient computer readable medium and comprising computer executable instructions, the computer executable instructions, when executed, cause a computer to perform a method for storing data, comprising:
   obtaining a first range of replica levels supported by a storage apparatus, the replica level indicating the number of replicas of data;
   receiving a replica configuration requirement for an application, the application supporting a second range of replica levels; and
   determining a first replica level for the storage apparatus and a second replica level for the application based on the replica configuration requirement, the first range and the second range.

20. The computer program product of claim 19, wherein the method for storing data further comprises:
   configuring the storage apparatus using the first replica level;
   configuring the application using the second replica level; and
   monitoring configuration of the storage apparatus and configuration of the application.

* * * * *